Patented Nov. 3, 1936

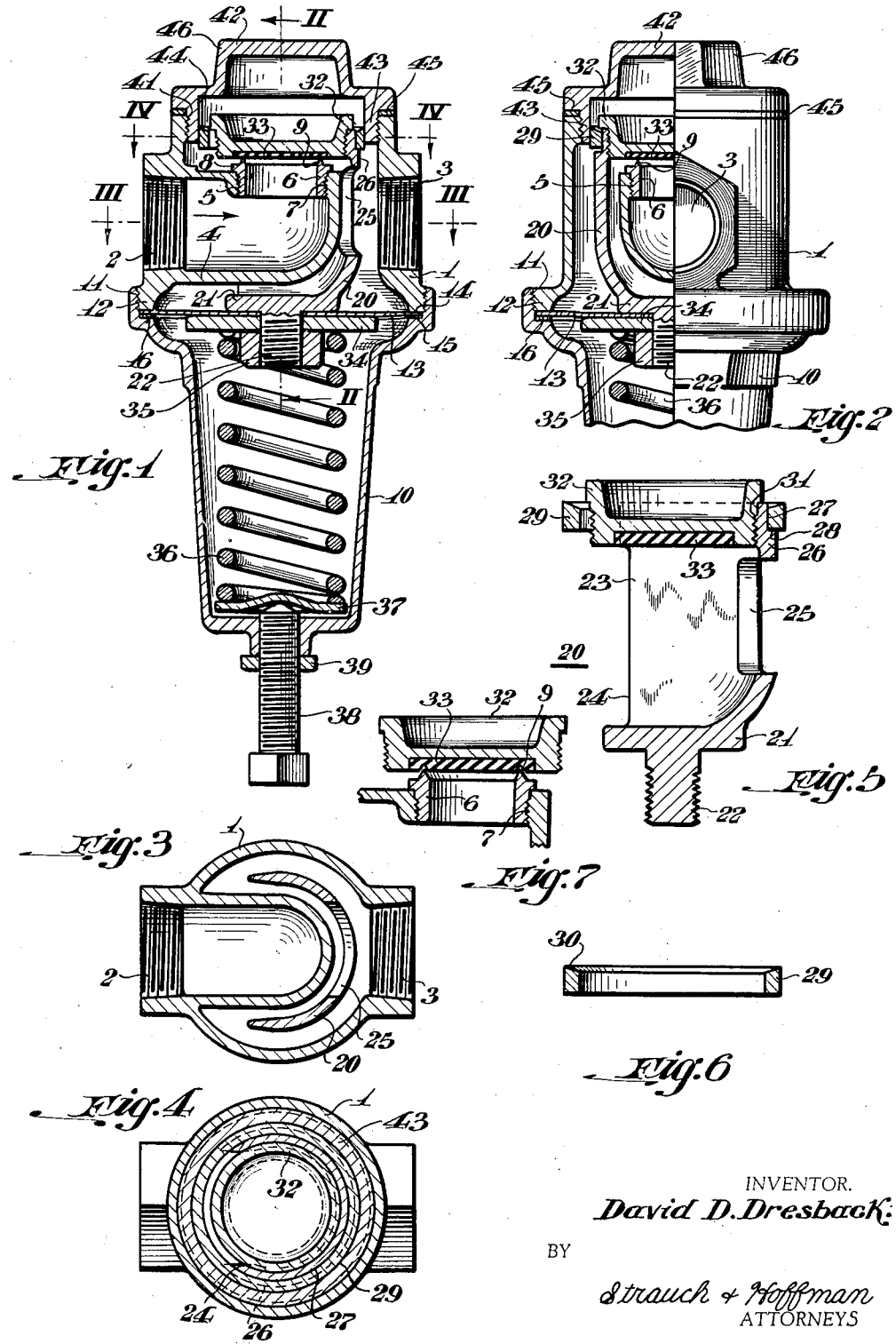

2,059,855

UNITED STATES PATENT OFFICE 2,059,855

FLUID PRESSURE REGULATOR

David D. Dresback, Pittsburgh, Pa., assignor to Pittsburgh Equitable Meter Company, Pittsburgh, Pa., a corporation of Pennsylvania Application January 30, 1934, Serial No. 709,045

1 Claim. (Cl. 50—23)

The present invention relates to fluid pressure regulators, and more particularly to water pressure regulators or reducing valves.

Regulators of this type are used generally in connection with domestic water service lines, hot water heating systems, and steam distribution lines, etc., and are required to give trouble free service over long periods of time. Also, they are sold at low prices, and therefore must not be expensive to manufacture.

A difficulty heretofore experienced has been caused by the corrosion of various parts of the valve thereby causing sticking of the parts, and scale or other foreign matter lodged on the seat prevent proper closing of the valve. Also, in valves employing a soft seat and a sharp edge valve member the valve edge cuts into the seat, and if the seat is not properly guided in its movement the valve will not seat always in the same part of the seat with the consequence that the seat becomes unevenly cut and worn and permits leakage therethrough.

According to the present invention, I provide a retaining ring surrounding the bifurcated yoke to prevent spreading thereof, and to lock the seat carrier in place to prevent loosening thereof in operation, the ring having a sharp edge and moving in a guide so that the guide is kept clear of foreign matter. This ring preferably is made of corrosion resisting material to further eliminate sticking of the parts due to corrosion. The tubular valve member is tapered inside and outside to form a sharp edge which cooperates with a soft seat carried by the diaphragm and serves to guide the seat in operation. This construction provides a sensitive valve in which only a small initial movement of the valve seat provides a passageway for fluid, which passageway enlarges substantially proportionately as the seat and valve member separate.

Accordingly, it is an object of the present invention to provide a guide for the movable seat which can be kept clear of scale or other foreign matter at all times to permit free operation thereof.

A further object is the provision of a retaining means for the yoke which will permit easy assembly and disassembly and serves as a guide therefor.

A further object is the provision of a valve member coacting with a soft seat, the valve member being tapered on both sides to form a relatively sharp end whereby the interior inclined face serves as a guide for the seat and the tapered surfaces limit the seating movement of the seat.

Still another object is the provision of a valve member coacting with a soft seat which provides a passage for flow therethrough upon very slight movement of the seat carried by the yoke.

These and other objects will be apparent from a consideration of the following specification taken in connection with the annexed drawing in which:

Figure 1 is a longitudinal section view of a preferred embodiment of my invention;

Figure 2 is a fragmentary view in longitudinal section on line II—II of Figure 1 taken in the direction of the arrows;

Figure 3 is a transverse section view on line III—III of Figure 1 taken in the direction of the arrows;

Figure 4 is a transverse section view on line IV—IV of Figure 1 taken in the direction of the arrows;

Figure 5 is a slightly enlarged detail view of the yoke member, valve seat and locking ring in assembled position;

Figure 6 is a sectional view of the locking ring; and

Figure 7 is an enlarged detail of the valve member and seat.

Referring to the drawing, the numeral 1 designates the body portion of the regulator or valve having a threaded inlet connection 2 and a threaded outlet connection 3. An integral nipple or extension 4 is directly connected to the inlet connection 2 and in the preferred embodiment forms an elbow with a threaded opening 5 formed in the end thereof. A tubular valve member designated generally by numeral 6 preferably is made of a non-corrodible alloy, such as non-corrodible chromium steel, commonly known as stainless steel, and has a threaded portion 7 which is received in the threaded opening 5 of the nipple, and a flange 8 on the valve member abuts the end of the nipple to limit the extent to which the sleeve is threaded into the nipple and provides a sealing shoulder. The wall at the outer edge of the valve member is tapered inwardly and outwardly to provide a relatively sharp edge 9.

A spring housing 10 is internally threaded at 11 and receives the threaded end 12 of the regulator body. A diaphragm 13 of fabric reenforced rubber or of any other suitable material has its periphery clamped between the face 14 of the body and an internal shoulder 15 formed on the spring housing 10, and a suitable metal gasket 16 may be interposed between the diaphragm and shoulder to prevent deformation of the diaphragm when the cover is screwed home.

A bifurcated yoke indicated generally by numeral 20 comprises a base portion 21 having a threaded stem 22 extending therefrom and an upstanding wall 23 which is cut away as indicated at 24. The wall 23 also has a passageway or port 25 formed therein diametrically opposite the cut away part 24. The wall 23 is thickened at its upper end as indicated at 26, this thickened portion likewise being bifurcated, and a portion thereof is cut away to provide a reduced cylindrical part 27 and a shoulder 28, and a non-corrodible ring 29 made of non-corrodible chromium steel or similar material and having a sharp edge 30, is adapted to slip over the reduced portion 27 and engage the shoulder 28. The cylindrical reduced portion 27 is of such size as to provide a machine clearance between the ring 29 and this portion, so that the ring can easily be slipped into place. The thickened portion 26 is internally threaded as indicated at 31 and receives an externally threaded plug or disc shaped valve seat holder 32. The seat holder receives an inserted disc 33 of rubber, lead, solder, leather or other suitable material which together with the edge 9 forms the valve.

In assembly, the threaded stem 22 of the yoke is passed through a suitable hole in the diaphragm 13, a plate or washer 34 is placed adjacent thereto, and a nut 35 is then threaded on the stem 22 and clamps the diaphragm between the washer and the base 21 of the yoke. The cover 10 then being removed, this assembled unit then is inserted in the opening in the threaded end 12, the bifurcation 24 permitting passage of the yoke past the nipple 4. A coil spring 36 and a thrust washer 37 is placed over the washer 34 and is then enclosed in the housing 10 which is threaded onto the body at 11 to clamp the diaphragm between the body and cover. The tension of the spring can be adjusted by a screw 38 bearing against the thrust washer 37 and is locked in adjusted position by the lock nut 39.

The opposite end of the body has a threaded opening 41, and through this opening the ring 29 is slipped over the reduced portion 27 of the yoke and the seat holder 32 is threaded into place so that the soft seat 33 is adapted to engage the sharp edge 9. The opening 41 is then closed by a cover 42 which has a threaded projection 43 engaging the threaded opening, and the internal face 44 of the cover is accurately machined to proper diameter to serve as a guide for the ring 29. A gasket 45 provides a seal to prevent leakage and the cover has a non-circular lug 46 to permit removal thereof.

In operation, the high pressure fluid enters the inlet 2, and ordinarily would pass through the nipple 4 and out the tubular valve member 6 into the yoke 20 and through the opening 25 and the bifurcation 24 of the yoke to the outlet 3 of the regulator. The area of the diaphragm 13 being greater than the area of the opening in valve member 6, the pressure of the fluid when it becomes too great will move the diaphragm downward and with it the yoke 20 causing the soft seat 33 to engage the sharp edge 9 of the valve member, and close the valve, thereby reducing the pressure of the fluid at the outlet to a value proportional to the area of the valve to the diaphragm. The spring 36 can be adjusted by means of screw 28 to place any desired load on the diaphragm and is locked in adjusted position by lock nut 39.

The ring 29 prevents the bifurcated yoke from spreading, and its outer surface engages the inner surface 44 of the cover 42 and thus guides the yoke in its reciprocation. When it becomes necessary to remove the valve seat carrier 32, if this carrier is corroded to the yoke, the slight turning torque will tend to spread the yoke within the machine clearance limit provided by the ring 29 thus breaking loose any corrosion and permit easy removal of this seat carrier. The sharp edge 30 of ring 29 cuts off any scale or foreign matter that may accumulate on the surface 44 and keeps this surface clean at all times. The edge 9 of the valve member is tapered on both sides to provide two sealing surfaces, and the inner taper serves also as a guide to insure that the valve seats always in the same area. Also, because of this construction and the guided movement of the seat only a slight movement of the seat is required to separate the valve and seat sufficiently to permit flow therethrough.

The invention may be embodied in other specific forms without departing from the spirit or essential characteristics thereof. The present embodiments are therefore to be considered in all respects as illustrative and not restrictive, the scope of the invention being indicated by the appended claim rather than the foregoing description, and all changes which come within the meaning and range of equivalency of the claim are therefore intended to be embraced therein.

What is desired to be secured by Letters Patent and claimed as new is:

In a fluid pressure regulator, a body portion having inlet and outlet connections, a diaphragm subject to outlet pressure of the regulator, a bifurcated yoke having an open end carried thereby, a plug having a valve seat and removably located in the open end of said yoke, and a retaining ring separate from said plug and longitudinally slidable on said yoke for locking said plug in place.

DAVID D. DRESBACK.